US006348669B1

(12) United States Patent
Rudd Little et al.

(10) Patent No.: US 6,348,669 B1
(45) Date of Patent: Feb. 19, 2002

(54) RF/MICROWAVE ENERGIZED PLASMA LIGHT SOURCE

(75) Inventors: Richard Anthony Rudd Little, Southampton; David Briggs, Berkshire, both of (GB)

(73) Assignee: JenAct Limited, Whitchurch (GB)

( * ) Notice: Subject to any disclaimer, the term of this patent is extended or adjusted under 35 U.S.C. 154(b) by 0 days.

(21) Appl. No.: 09/673,047

(22) PCT Filed: Apr. 8, 1999

(86) PCT No.: PCT/GB99/01084

§ 371 Date: Nov. 30, 2000

§ 102(e) Date: Nov. 30, 2000

(87) PCT Pub. No.: WO99/53524

PCT Pub. Date: Oct. 21, 1999

(30) Foreign Application Priority Data

Apr. 9, 1998 (GB) ............................................ 9807844

(51) Int. Cl.[7] ................................................ B23K 10/00

(52) U.S. Cl. .............................. 219/121.43; 219/121.4; 219/121.48; 156/345; 118/723 MW

(58) Field of Search ......................... 219/121.43, 121.4, 219/121.48, 121.41; 156/345; 118/723 MW; 204/298.37, 398.38

(56) References Cited

U.S. PATENT DOCUMENTS

| | | | | |
|---|---|---|---|---|
| 4,063,132 A | | 12/1977 | Proud et al. | 315/248 |
| 4,161,436 A | * | 7/1979 | Gould | 204/157.1 R |
| 4,189,661 A | | 2/1980 | Haugsjaa et al. | 315/39 |
| 4,933,602 A | * | 6/1990 | Ono et al. | 315/39 |
| 5,633,830 A | | 5/1997 | Sung et al. | 365/221 |
| 5,734,221 A | | 3/1998 | van Os | 313/113 |
| 6,028,315 A | * | 2/2000 | Bailey et al. | 250/455.11 |

FOREIGN PATENT DOCUMENTS

| | | |
|---|---|---|
| DE | 42 02 734 | 8/1993 |
| EP | 0 377 442 | 7/1990 |
| EP | 0 769 804 | 4/1997 |
| FR | 2 674 526 | 10/1992 |
| GB | 2 307 079 | 5/1997 |
| JP | 61 046290 | 3/1986 |
| JP | 61 198545 | 9/1986 |
| JP | 5-62649 | 3/1993 |
| JP | 50 62649 | 3/1993 |
| WO | 97/35624 | 10/1997 |
| WO | 98/37962 | 9/1998 |

* cited by examiner

*Primary Examiner*—Mark Paschall
(74) *Attorney, Agent, or Firm*—Synnestvedt & Lechner LLP

(57) ABSTRACT

Apparatus for radiating energy at one or more predetermined wavelength comprising: a housing (4), a source of microwave energy coupled to and located outside the housing and a window forming part of the wall of the housing, the window being formed from a material which is substantially transparent to radiation at the or each predetermined wavelength and at the wavelength of the microwave source, the window including gas of a predetermined composition at a predetermined pressure contained in a gas-tight enclosure (2) defined by the window material, the gas composition being chosen to emit energy at the or each predetermined wavelength in response to microwave energy from the housing (4) impinging generally on an inner surface of the window, the window being arranged substantially to be opaque at the wavelength of the microwave energy and being arranged to provide an unobstructed radiating path from its outer surface for the energy of the or each predetermined wavelength.

13 Claims, 2 Drawing Sheets

RF/MICROWAVE ENERGIZED PLASMA LIGHT SOURCE

The present invention relates to apparatus for emitting light.

BACKGROUND OF THE INVENTION

Lamps using energisation of UV emitting plasmas, particularly for specific spectral wavelength requirements such as curing of chemical compounds and sterilisation purpose are known. They have several advantages over arc lamps such as long lamp life, stable lamp output, and a wide variation of possible lamp envelope designs. Furthermore such lamps are electrodeless and thus the effect of fill materials on electrode material does not need to be taken into account.

Several methods of energising UV light emitting plasmas exist. U.S. Pat. No. 1,482,950 and U.S. Pat. No. 4,042,850 describe non-resonant microwave cavities containing a microwave energised plasma bulb, where one wall of the cavity is constructed of a mesh material which contains microwave energy in the cavity and allows the passage of UV emitted light Since, a UV reflector forms part of the cavity, a compromise has to be reached between optimising the microwave cavity dimensions and optimising the UV light output characteristics.

U.S. Pat. No. 5,166,528 and WO 96 09842A both describe resonant microwave cavities into which are placed electrodeless UV light emitting bulbs for sterilisation purposes. Sterilisation done in this way must be a batch process and articles to be sterilised must not be affected by or substantially absorb microwave radiation since in use, the articles am exposed to the energising microwave field.

WO 97/35624 describes a vessel, to be placed in a microwave field constructed of materials which emit UV light when excited by microwave radiation and which attenuate microwave radiation so as to protect the contents of the vessel from said radiation. Operation is possible within a resonant or non-resonant microwave field but the techniques is suitable only for batch processes and involves complex and costly techniques for the construction of the UV emitting vessel.

GB 2048589A, GB 204225A and GB 2307097A all refer to the energisation of a UV light emitting plasma bulb by microwave radiation coupled to tie bulb via a coaxial system. In each case, provision needs to be made to prevent leakage of microwave radiation and the techniques r ed to do this limit the emission of UV light and the accessibility to the UV emitting plasma bulb.

Thus various methods of microwave energisation for the production of UV light have been developed for chemical and sterilisation processes. In all cases, the methods used for limiting or preventing microwave leakage compromise the UV light emissions by shadowing, In some cases, these method result in the need for a batch process.

Additionally, exposure of the product to be treated, by UV light to microwave radiation is undesirable in some cases which prevents the use of all the above methods expect that of WO97/35624. Even using the techniques of WO97/35624, the product to be exposed has to be small enough to fit into a sterilisation vessel within a microwave cavity and the process must be a batch process.

BRIEF SUMMARY OF THE INVENTION

Apparatus for radiating energy at one or more predetermined wavelength comprising, a housing, a source of microwave energy coupled to and located outside the housing and a window forming part of the wall of the housing, the window being formed form a material which is substantially transparent to radiation at the or each predetermined wavelength and at the wavelength of the microwave source, the window including gas of a predetermined composition at a predetermined pressure contained in a gas-tight enclosure defined by the window material, the gas composition being chosen to emit energy at the or each predetermined wavelength in response to microwave energy from the housing impinging generally on an inner surface of the window, the window being arranged substantially to be opaque at the wavelength of the microwave energy and being arranged to provide an unobstructed radiating path from its outer surface for the energy of the or each predetermined wavelength.

The cavity may be resonant or non-resonant.

The present invention allows products of any size to be irradiated on a continuous process basis by UV or visible light excited by rf (typically microwave) radiation without that light, being reduced by the necessity of providing a method of reducing or preventing rf leakage. In addition, the present invention substantially prevents a product to be irradiated from being exposed to the rf radiation.

Preferably the apparatus includes an electrically conductive rod extending generally from the rf coupling into the cavity. More particularly, the rod will be electrically coupled to the centre conductor of the coupling. The effect of this is more evenly to distribute the intensity of the light across the window.

Preferably at least part of the cavity wall is constructed and arranged as a reflector to direct light which is emitted from the window into the cavity back out of the cavity through the window. This increases efficiency of light emission by using light which is emitted away from the product to be irradiated (i.e. into the cavity) back in the direction of the product.

Additionally or alternatively, one or more separate reflectors may be mounted in the cavity which are constructed and arranged to direct light emitted from the window into the cavity back out of the window. The materials should be transparent to the predetermined wavelength rf energy but reflective to the one or more predetermined light wavelengths. A suitable material is a PTPE-based material.

To further improve efficiency, either of the above reflectors or both may be focusing reflectors.

The window may form a recess into the cavity in which case a product to be irradiated may be inserted into the cavity. Alternatively, the window may be generally planar.

By arranging for the window to be generally tubular and to interconnect two faces of the cavity, it is possible to allow a continuous product to be passed through the tubular window and be irradiated by the one or more predetermined wavelengths of light during its passage therethrough.

Preferably, the window forms an outwardly curving wall of the cavity. This gives a greater spread of light.

BRIEF DESCRIPTION OF THE DRAWINGS

The invention will now be described by way of example with reference to the drawings in which.

DETAILED DESCRIPTION OF THE INVENTION

Figure 1A:
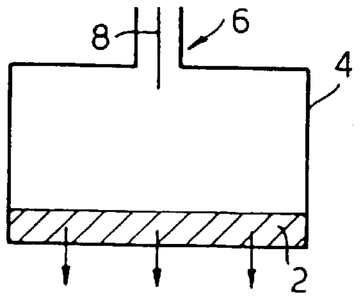
FIG. 1A shows apparatus in accordance with the invention having a planar window.

With reference to FIG. 1A, it will be seen that a vessel 2 preferably constructed from and UV/visible light transmissive material is fixed in an rf/microwave cavity 4.

The vessel 2 contains a fill material which when excited to a plasma state emits UV/visible light in a desired wavelength. The vessel 2 is mounted in the cavity 4 in such a way that it forms part of the outer wall of the cavity. The cavity 4 is dimensioned to be a resonant or non-resonant cavity and may be a so-called multi-mode resonant cavity.

Rf/microwave energy fed into the cavity via coupling 6 enters the vessel 2 and excites the materials within it to form a plasma.

The plasma performs two functions. Firstly it emits UV/visible light outside the rf/microwave cavity. Secondly it acts as a lossy conductor thereby attenuating rf microwave radiation which otherwise would escape from the cavity 4 via the vessel 2. Also, by acting as a conductor, the shape and nature of the original rf microwave cavity may remain largely unchanged since the vessel's effect on the rf field within the cavity in use, is relatively small.

Thus, the advantages of an rf energised light emitting bulb are realised but without the disadvantages of items to be irradiated being exposed to the rf radiation and without it being necessary to place the bulb and/or the product within a microwave cavity. Thus allowing the emitted light to be used in a continuous process.

Preferably the materials within the UV/visible light emitting bulb are chosen to maximise the required spectral output and maximise the conductive and thus rf/microwave attenuating nature of the plasma generated. A typical fill material for the vessel 2 is argon and mercury, Typically, the internal pressure of the gas in the vessel is in the range 5 to 10 millibar and the volume of mercury is approximately 0.2 milligrams per cubic centimetre of internal volume of the vessel.

In FIG. 1A, the vessel 2 (typically of quartz) forms a window which extends over almost the entirety of one wall of a generally cuboid cavity 4. Those parts of the cavity which are not ford by the vessel 2, typically will be metallic conductors and preferably should be reflective at the desired wavelength of light emission from the vessel. In this way, the light output of the apparatus is maximised.

It will be appreciated that with the arrangement in FIG. 1A, light is emitted from the apparatus in many directions.

Figure 1B:
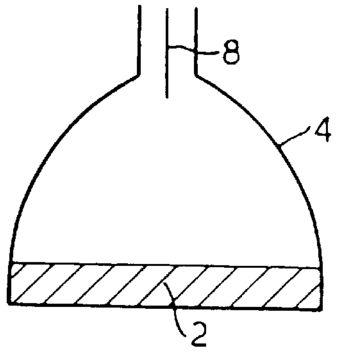
FIG. 1B shows apparats in accordance with the invention having a planar window and reflector formed from a cavity wall.

In FIG. 1B, the cavity is at least partially shaped as a focusing reflector which increases the intensity of light emitted from the apparatus in a particular direction at the cost of reduced beam diversions.

Figure 2:
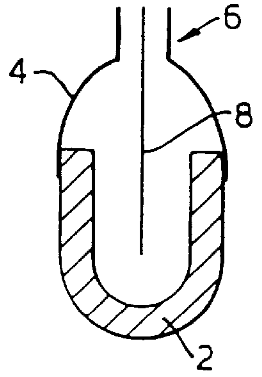
FIG. 2 shows apparatus in accordance with the invention having an extended centre conductor.

FIG. 2 shows an extension of the centre conductor of the rf/microwave coupling 6.

The extended centre conductor 8 acts to reduce intensity variations across the vessel 2.

It will be appreciated that ideally, a relatively large multi-mode cavity would be used with typical dimensions of the order of 192 millimeters by 185 millimeters by 75 millimeters with die vessel filling about a third of the width of one of the long walls of the cavity. However, with space considerations in mind and with the possibility of forming a focusing reflector from the cavity walls, an ideal rf field distribution may not be attainable. Thus using a combination of cavity dimensions and ended centre conductor variations, it is possible to obtain suitably even illuminations across the vessel 2.

A typical material for the centre conductor extension may be mild steel coated with copper. With the arrangement shown in FIG. 2 of a generally elliptical cavity formed by the vessel 2 and reflective walls 4 having a maximum diameter of approximately 50 millimeters and a minimum diameter of approximately 20 millimeters, the centre conductor extension has been found to be optimal at around 30 millimeters. A typical diameter for the centre conductor in that application is of the order of 1 to 2 millimeters.

Figure 3:
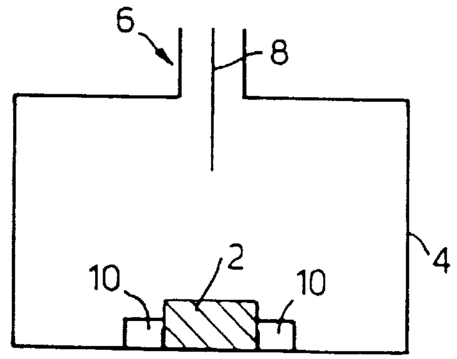
FIG. 3 shows apparatus in accordance with the invention having a planar window of smaller dimension than the cavity wall.

In some applications, it may be desired to dimension the vessel 2 such that the aperture within which it fits is beyond cut off. In this case, rf chokes (typically quarterwave chokes) may be used to minimise rf leakage around the interface between the vessel and the cavity walls. Examples of applications where chokes may be required are shown in FIGS. 3, 5 and 6.

Figure 4:
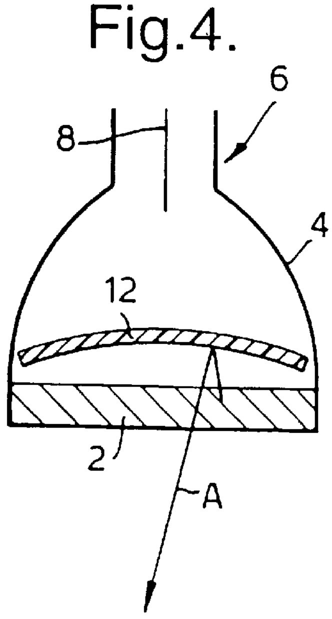
FIG. 4 shows apparatus in accordance with the invention having a separate reflector mounted in the cavity.

With reference to FIG. 4, to more efficiently reflect light emitted from the vessel 2 or to focus it differently from the focus pattern dictated by the walls of the cavity 4, one or more separate reflectors 12 may be mounted in the cavity 4. A typical material for a UV and microwave embodiment is PTE-based material. The material should be transmissive to the rf energy to allow it to impinge on the vessel 2 and should be reflective to the tight emitted by the vessel 2 as shown generally by the arrow A.

Figure 5:
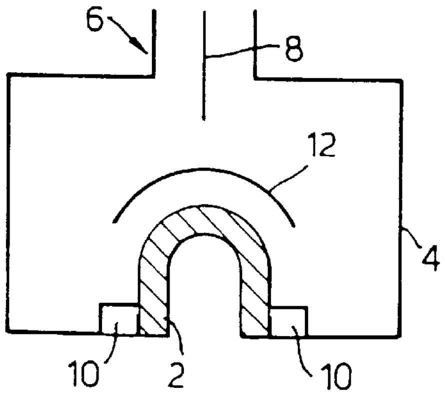
FIG. 5 shows apparatus in accordance with the invention with a recessed window.

FIG. 5 shows a vessel which is recessed into the cavity 4. This allows products to be placed into the recess which may allow greater coverage of the product without requiring additional reflectors or additional light emitting apparatus to be used.

Figure 6:
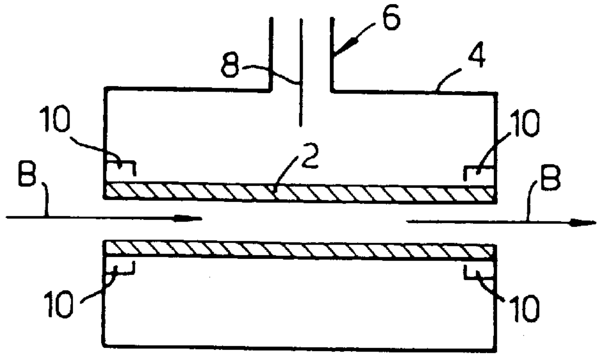
FIG. 6 shows apparatus in accordance with the invention with a generally tubular window.

FIG. 6 shows a generally tubular vessel 2 interconnecting two walls of the cavity 4. This allows mammal to be passed through the vessel 2 as shown generally by the arrows B. This is particularly convenient for irradiating or sterilising continuous materials or continuous flows.

Figure 7A:
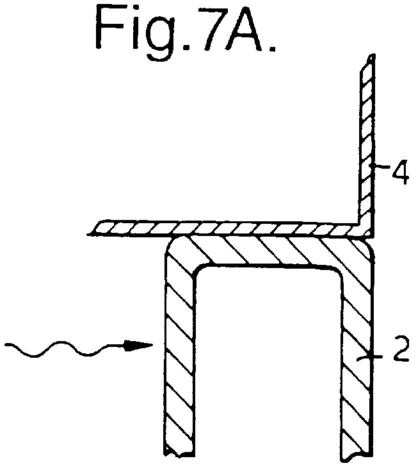
FIGS. 7A and 7B show alternative mounting arrangements for the window in the cavity in accordance with the invention.
Figure 7B:
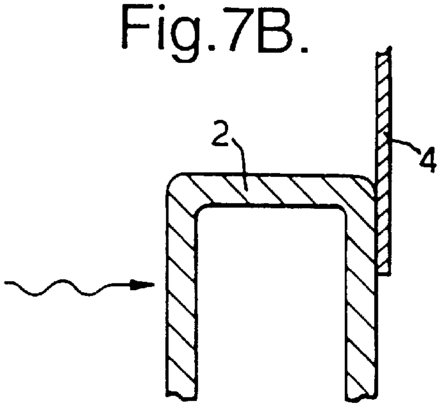

FIGS. 7A and 7B how alternative arrangements for the interface between the vessel 2 and the conductive walls of the cavity 4. Each of these arrangements will be effective where the aperture defined by the sides of the cavity 4 is not beyond cut off.

Figure 8A:
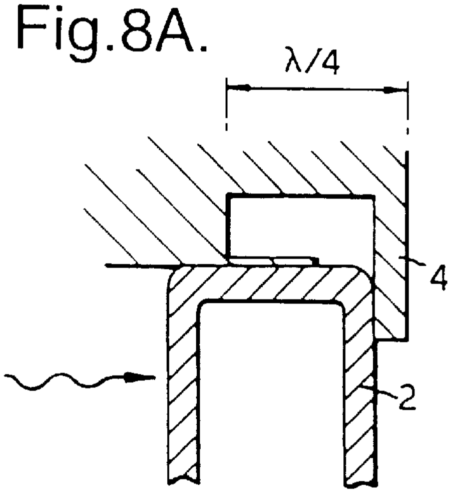
FIGS. 8A and 8B show alternative choke arrangements in accordance with the invention.
Figure 8B:
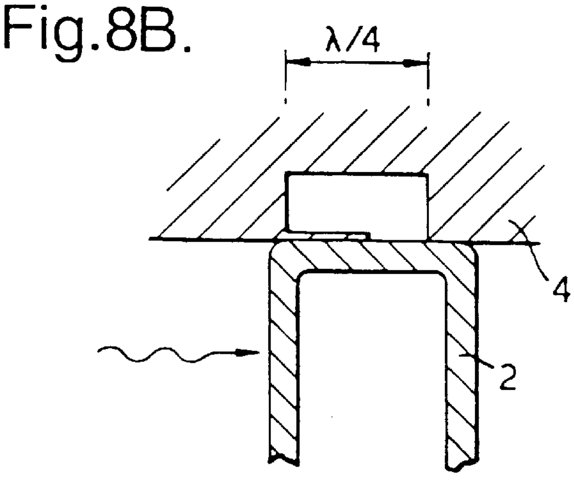

FIGS. 8A and 8B show quarterwave choke arrangements for use to minimise rf leakage where the aperture defined by the cavity walls 4 is beyond cut off at the rf wavelength used.

Thus in summary, all the embodiments described above allow products to be irradiated with light typically ultraviolet light whilst being largely protected from the effects of the rf (typically microwave) energy source. This will have wide application both in the UV field where curing and sterilisation applications proliferate and also in any field where energised plasma light sources produce light in desirable wavelengths.

What is claim is:

1. Apparatus for radiating energy at one or more predetermined wavelengths comprising, a housing, a source of microwave energy coupled to and located outside the housing and a window forming part of the wall of the housing, the window comprising a gas tight enclosure formed from a material which is substantially transparent to radiation at the or each predetermined wavelength and at the wavelength of the microwave source, said enclosure containing gas of a predetermined composition at a predetermined pressure, the gas composition and pressure being chosen to cause emission of energy at the or each predetermined wavelength in response to microwave energy from the housing passing through an inner surface of the window and impinging on the gas contained therein, thereby exciting the gas to form a plasma, the housing being arranged to form a microwave resonant cavity and the plasma being substantially opaque at the wavelength of the microwave energy and thereby attenuating the microwave energy which otherwise would escape from said cavity, said plasma thereby allowing said window to be arranged to provide an unobstructed radiating path for the energy of the or each predetermined wavelength.

2. Apparatus according to claim 1, including a quarter-wave choke formed at the interface between the window and the remainder of the housing.

3. Apparatus according to claim 1, wherein the window is generally tubular and interconnects two faces of the housing whereby material may be passed through the housing via the window, the apparatus further including a quarter-wave choke formed at the interface between the window and the remainder of the housing.

4. Apparatus according to claim 1, wherein the window forms an outwardly directed wall of the housing, the apparatus further including a quarter-wave choke formed at the interface between the window and the remainder of the housing.

5. Apparatus according to claim 1, wherein the window forms a recess into the housing.

6. Apparatus according to claim 2, wherein the window forms a recess into the housing.

7. Apparatus according to claim 1, including a reflector mounted in the housing constructed and arranged to direct light emitted from the window into the housing back out of the window.

8. Apparatus according to claim 2, including a reflector mounted in the housing constructed and arranged to direct light emitted from the window into the housing back out of the window.

9. Apparatus according to claim 5, including a reflector mounted in the housing constructed and arranged to direct light emitted from the window into the housing back out of the window.

10. Apparatus according to claim 6, including a reflector mounted in the housing constructed and arranged to direct light emitted from the window into the housing back out of the window.

11. Apparatus according to claim 7, wherein the reflector is formed from PTFE.

12. Apparatus according to claim 7, wherein the reflector is integral with the housing wall.

13. Apparatus according to claim 7, wherein the reflector is a focussing reflector.

* * * * *